(12) United States Patent
Shi et al.

(10) Patent No.: US 11,487,947 B2
(45) Date of Patent: Nov. 1, 2022

(54) MACHINE LEARNING TECHNIQUES FOR ANALYZING TEXTUAL CONTENT

(71) Applicant: Microsoft Technology Licensing, LLC, Redmond, WA (US)

(72) Inventors: Baoxu Shi, San Jose, CA (US); Angie Zhu, Mountain View, CA (US); Feng Guo, Los Gatos, CA (US); Jaewon Yang, Campbell, CA (US); Fei Chen, Saratoga, CA (US); Qi He, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 254 days.

(21) Appl. No.: 16/716,402

(22) Filed: Dec. 16, 2019

(65) Prior Publication Data
US 2021/0182496 A1 Jun. 17, 2021

(51) Int. Cl.
*G06F 17/00* (2019.01)
*G06F 40/30* (2020.01)
*G06F 16/93* (2019.01)
*G06F 40/289* (2020.01)
(Continued)

(52) U.S. Cl.
CPC .............. *G06F 40/30* (2020.01); *G06F 16/93* (2019.01); *G06F 40/284* (2020.01); *G06F 40/289* (2020.01); *G06N 20/00* (2019.01)

(58) Field of Classification Search
CPC ........ G06F 40/30; G06F 16/93; G06F 40/289; G06F 40/284; G06F 16/3344; G06N 20/00; G06N 3/0454; G06N 3/08
See application file for complete search history.

(56) References Cited

U.S. PATENT DOCUMENTS

| 8,972,396 B1* | 3/2015 | Zhang | G06F 16/3346 |
| | | | 707/750 |
| 2004/0236725 A1* | 11/2004 | Amitay | G06F 16/3338 |

(Continued)

OTHER PUBLICATIONS

Fang, Lei, and Minlie Huang. "Fine granular aspect analysis using latent structural models." Proceedings of the 50th Annual Meeting of the Association for Computational Linguistics (vol. 2: Short Papers). 2012 (Year: 2012).*

(Continued)

*Primary Examiner* — Andrew T McIntosh
(74) *Attorney, Agent, or Firm* — Schwegman Lundberg & Woessner, P.A.

(57) ABSTRACT

Techniques are provided for using machine learning techniques to analyze textual content. In one technique, a potential item is identified within a document. An analysis of the potential item is performed at multiple levels of granularity that includes two or more of a sentence level, a segment level, or a document level. The analysis produces multiple outputs, one for each level of granularity in the multiple levels of granularity. The outputs are input into a machine-learned model to generate a score for the potential item. Based on the score, the potential item is presented on a computing device. In response to user selection of the potential item, an association between the potential item and the document is created. The association may be used later to identify a set of users to which the document (or data thereof) is to be presented.

20 Claims, 8 Drawing Sheets

(51) Int. Cl.
    *G06F 40/284*    (2020.01)
    *G06N 20/00*    (2019.01)

(56) References Cited

U.S. PATENT DOCUMENTS

2015/0309989 A1* 10/2015 Brav .................. G06F 16/93
                                                      704/9
2020/0401661 A1* 12/2020 Kota .................. G06F 40/30
2021/0103854 A1*  4/2021 Misra ................. G06F 40/30

OTHER PUBLICATIONS

Cheng, Jianpeng, and Mirella Lapata. "Neural summarization by extracting sentences and words." arXiv preprint arXiv:1603.07252 (2016). (Year: 2016).*

* cited by examiner

MACHINE LEARNING TECHNIQUES FOR ANALYZING TEXTUAL CONTENT

TECHNICAL FIELD

The present disclosure relates to machine learning and, more particularly, to using machine learning techniques to train a model for analyzing items discovered in textual content. SUGGESTED GROUP ART UNIT: 2129; SUGGESTED CLASSIFICATION: 706/12.

BACKGROUND

The Internet has facilitated the rapid development of modern technologies, including instant communication and coordination regardless of geography. Modern technology has transformed many industries, including talent acquisition. Opportunity providers have access to a virtually limitless pool of geographically dispersed candidates while candidates can be matched to many different organizations. Opportunity providers leverage opportunity platforms to post opportunities while candidates leverage the same opportunity platforms to research those opportunities.

An opportunity platform has an incentive to improve the process for opportunity providers to create electronic content about an opportunity and distribute the electronic content over one or more computer networks to actual and/or potential candidates. One way to improve that process is to provide suggestions on what to include in content describing an opportunity. Current approaches tend to be limited and rely too heavily on string matching without understanding the context of a piece of text when providing suggestions. Thus, current approaches result in too many suggestions being of no use, which can make the opportunity creation process experience worse for opportunity providers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for analyzing items discovered in textual content using machine learning techniques are provided. In one technique, potential items of a particular type are identified within a document. For each identified potential item, it is determined whether that potential item should be presented to a creator or author of the document. If so, then the creator/author may select that potential item, which will be associated with the document thereafter. The determination of whether to present may involve one or more techniques, such as analyzing the potential item at one or more levels of granularity within the document: the sentence level, the segment level, and/or the document level. These techniques involve leveraging learned entity embeddings and one or more machine-learned models to generate a score that is used to make the determination.

Embodiments improve computer-related technology in the field of analyzing text by leveraging a new system and process for implementing machine-learning techniques to generate more relevant recommendations. Prior approaches leveraged attribute features, which tend to result in lower quality recommendations. Unlike those prior approaches, embodiments described herein model the relationship between potential items (e.g., skills) and documents (e.g., opportunity postings) using content signals from different granularities.

System Overview

Figure 1:
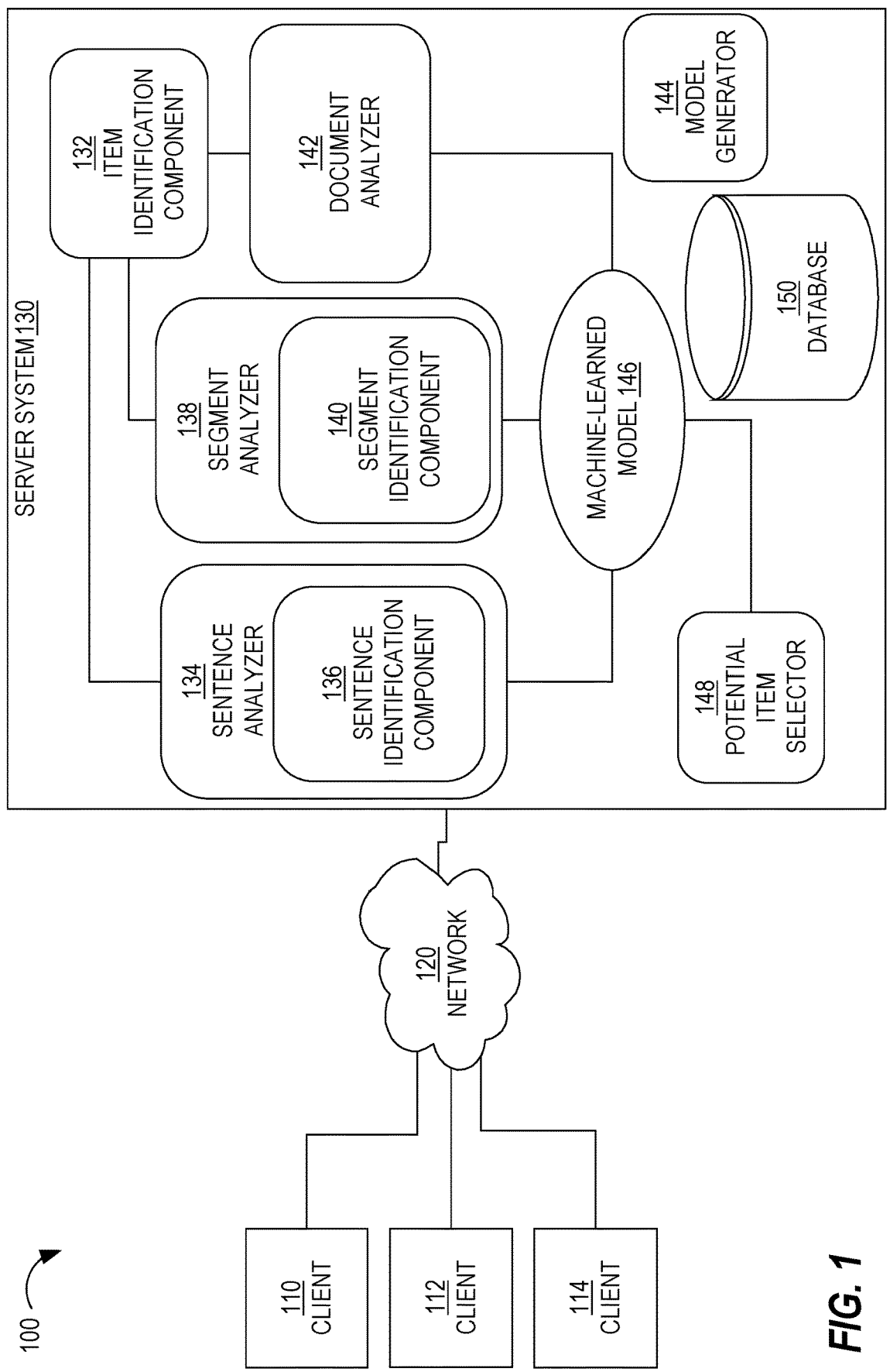
FIG. 1 is a block diagram that depicts an example system for analyzing items discovered in textual content, in an embodiment.

FIG. 1 is a block diagram that depicts an example system 100 for analyzing items discovered in textual content, in an embodiment. System 100 includes clients 110-114, network 120, and server system 130.

Each of clients 110-114 is an application or computing device that is configured to communicate with server system 130 over network 120. Examples of computing devices include a laptop computer, a tablet computer, a smartphone, a desktop computer, and a personal digital assistant (PDA). An example of an application includes a native application that is installed and executed on a local computing device and that is configured to communicate with server system 130 over network 120. Another example of an application is a web application that is downloaded from server system 130 and that executes within a web browser running on a computing device. Each of clients 110-114 may be implemented in hardware, software, or a combination of hardware and software. Although only three clients 110-114 are depicted, system 100 may include many more clients that interact with server system 130 over network 120.

Network 120 may be implemented on any medium or mechanism that provides for the exchange of data between clients 110-114 and server system 130. Examples of network 120 include, without limitation, a network such as a Local Area Network (LAN), Wide Area Network (WAN), Ethernet or the Internet, or one or more terrestrial, satellite or wireless links.

Server system 130 includes an entity identification component 132, a sentence analyzer 134, a sentence identification component 136, a segment analyzer 138, a segment identification component 140, a document analyzer 142, a model generator 144, a machine-learned model 146, and potential item selector 148. Each of these elements of server system 130 and described in more detail herein and may be implemented in hardware, software, or a combination of hardware and software.

Although depicted as a single element, server system 130 may comprise multiple computing elements and devices, connected in a local network or distributed regionally or globally across many networks, such as the Internet. Thus, server system 130 may comprise multiple computing elements other than the depicted elements.

Additionally, although only a single machine-learned model 146 is depicted, server system 130 may include multiple machine-learned models. Also, although different elements (e.g., components and analyzers) are depicted separately or as part of another element, such elements may be implemented in separate programs or as part of a single program, which may have multiple instances running concurrently.

Furthermore, while model generator 144 and machine-learned model 146 are depicted as being part of server system 130, model generator 144 and machine-learned model 146 may be implemented separately from server system 130 and even by a different party that owns and operates server system 130. Thus, one party may implement model generator 144 and train machine-learned model 146 while another party leverages machine-learned model 146 in scoring and/or ranking potential items.

Machine Learning

Machine-learned model 146 is automatically trained using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values. The statistical model is trained based on multiple attributes. In machine learning parlance, such attributes are referred to as "features." To generate and train a statistical prediction model, a set of features is specified and a set of training data is identified.

Embodiments are not limited to any particular machine learning technique for training a model. Example machine learning techniques include linear regression, logistic regression, neural networks, random forests, naive Bayes, Support Vector Machines (SVMs), and XGBoost, which is relatively fast, interpretable, and scalable. Advantages that machine-learned models have over handcrafted rule-based models include the ability of machine-learned models to output a probability (as opposed to a number that might not be translatable to a probability), the ability of machine-learned models to capture non-linear correlations between features, and the reduction in bias in determining weights for different features.

Potential Items and Documents

Reference hereinafter to "potential item" can refer to both the name of the potential item and the potential item itself. For example, "Java" can refer to both the text "Java" and the skill itself. Therefore, "potential item" may be something that a person can have as an attribute (e.g., as a skill) and is something that is found (or is located) in a document (i.e., as text).

A potential item (or the text thereof) appears in a document, which may include zero or more potential items. Thus, after analyzing one document, no potential items are identified (using techniques described herein), while after analyzing another document, multiple potential items are identified. A document is a grouping of text, such as a alphanumeric characters, that a computer program can read and process. A document includes multiple phrases and/or sentences. Examples of a document include an online posting (e.g., an opportunity posting), a blog, a news article, a resume, and a profile of a user, organization, group, or event. The author of a document may be the same as or different than the user who ultimately provides the document to server system 130. Similarly, the user who provides the document to server system 130 may be the same as, or different than, the user to which the potential item is presented.

A potential item is an item that is a candidate for presentation to a user as a result of the item (e.g., likely) being of the particular type. A potential item may be an item of a particular type. For example, in the context where documents are opportunity postings (described in more detail herein), the user is an opportunity poster, the particular type may be "skill," and a potential skill that is identified from an opportunity posting may be presented to the opportunity poster if it is determined that the potential skill is a skill that the opportunity poster is likely to include (or associate) with the opportunity posting if the potential skill is presented to the opportunity poster. Associating the proper skills with an opportunity posting is important since such skills are used to associate the opportunity posting with potential applicants or opportunity seekers. Assisting an opportunity poster by presenting the appropriate skills will increase the chances that a relevant set of potential skills is identified for the opportunity posting. Presenting inappropriate or irrelevant skills may distract the opportunity poster from including appropriate skills.

In one mode of server system 130, a user (e.g., an opportunity poster) is able to accept or reject a potential item that server system 130 presents to the user. If accepted, then the potential item is associated with the corresponding document thereafter. If the user rejects the potential item, then the potential item is not associated with the corresponding document thereafter. However, rejecting a potential item does not mean that the potential item will be removed from the document.

In another mode of server system 130, a user is unable to accept or reject a potential item that the server system 130 selects for a document. Instead, the potential item is automatically associated with the document. In fact, the user might not be notified of the association. In either mode, as described herein, user feedback to accept and reject may be used to create positive and negative training instances to train one or more machine-learned models.

Associating a potential item with a document does not necessarily mean that another copy of the potential item will be included in the document when the document is presented to other users of server system 130. As in the example above, an associated potential item may be used to identify users to whom the corresponding document (or a portion thereof, such as a title, an extracted sentence, and/or an image thereof) should be presented, such as users who might have an affinity to that potential item. The presentation may be in the form of a recommendation that refers to the document and may include some content from the document. The affinity to the document may be determined based on profile attributes of the users and/or online (e.g., search or page view) history of the users. For example, if a user has a particular skill listed in his/her profile and the particular skill is also associated with a opportunity posting, then the user may be identified as a candidate to receive an opportunity recommendation that refers (e.g., links) to the opportunity posting.

In the context of opportunity postings and potential skills, potential skills that are not skills should not be presented to the user. For example, "401(k)" may be a skill for investment advisors but not for software engineers. Thus, if "401(k)" is found in an opportunity posting for a software engineer, then such an entity is more likely to be a benefit rather than a skill that is needed for the opportunity. If "401(k)" is presented as an option for an opportunity poster to select, then more relevant skills will not be presented to the poster.

Opportunities

In the context of opportunity (or job) postings, an opportunity poster is an individual, an organization, or a group of individuals responsible for posting information about an opportunity for a job. An opportunity poster may be different than the entity that provides the opportunity (i.e., the "opportunity provider"). For example, the opportunity poster may be an individual that is employed by the opportunity provider. As another example, the opportunity poster may be a recruiter that is hired by the opportunity provider to create one or more opportunity postings. An opportunity provider may be an individual, an organization (e.g., company or association), or a group of individuals that require, or at least desire, a job to be performed.

An opportunity posting describes an opportunity, such as prerequisites for accepting the opportunity, a description of tasks that a person is expected to perform if hired for the opportunity, and benefits of performing those tasks and/or of being affiliated with the provider of the opportunity.

A "job" is a task or piece of work. A job may be voluntary in the sense that the job performer (the person who agreed to perform the job) has no expectation of receiving anything in exchange, such as compensation, a reward, or anything else of value to the job performer or another. Alternatively, something may be given to the job performer in exchange for the job performer's performance of the job, such as money, a positive review, an endorsement, goods, a service, or anything else of value to the job performer. In some arrangements, in addition to or instead of the opportunity provider, a third-party provides something of value to the job performer, such as academic credit to an academic institution.

An opportunity is associated with an opportunity provider. If a candidate for an opportunity is hired, then the particular entity becomes the employer of the candidate. An opportunity may pertain to full-time employment (e.g., hourly or salaried), part-time employment (e.g., 20 hours per week), contract work, or a specific set of one or more tasks to complete, after which employment may automatically cease with no promise of additional tasks to perform.

An "opportunity seeker" is a person searching for one or more jobs, whether full-time, part-time, or some other type of arrangement, such as temporary contract work. An opportunity seeker becomes an applicant for an opportunity when the opportunity seeker applies to the opportunity. Applying to an opportunity may occur in one of multiple ways, such as submitting a resume online (e.g., selecting an "Apply" button on a company page that lists an opportunity, selecting an "Apply" button in an online advertisement displayed on a web page presented to the opportunity seeker, or sending a resume to a particular email address) or via the mail, or confirming with a recruiter that the opportunity seeker wants to apply for the opportunity.

Embodiments are not limited to the particular type of potential item being skills or even the context being opportunity postings. For example, the particular type may be industry or seniority. As another example, the context may be postings that are unrelated to opportunities and the potential items may be hashtags. Thus, the hashtags may be recommendations that are presented to a particular user who writes a post on his/her home page or feed, which post may be shared (along with any hashtags selected by the particular user) with others users who are connected to or otherwise affiliated with the user.

Identifying Potential Items in a Document

An author or creator of a document leverages a client (e.g., client 110) to create or upload a document. For example, client 110 executes a web application that communicates with server system 130 over network 120. The web application allows a user of client 110 to compose a document, such as an opportunity (or job) posting. The text that the user enters is transmitted (e.g., character by character as the text is entered) to server system 130. Entity identification component 132 receives the text and performs analysis to identify any potential items within the text.

A potential item may be identified in a document or set of text (e.g., an online posting) in one or more ways. For example, server system 130 includes a database 150, or pre-defined set, of entity names. Database 150 may be limited to storing names of items of a particular type, such as skills. The source of entity names found in database 150 may vary. Examples of sources for skills include user profiles, organization profiles, and opportunity postings. A user profile may list skills that the corresponding user has. Similarly, an organization profile may list skills that the organizations requires for certain jobs or roles within the organization. An opportunity posting may list skills that are required for a specific job. Different criteria may be used to determine whether to store a skill in database 150. For example, a skill must appear in all three types of sources (or a subset thereof) in order to be stored in database 150. As another example, a skill must appear in a certain number of user profiles in order to be stored in database 150.

Entity identification component 132 compares each word or short phrase from the document to each entity name (e.g., of the particular type) from database 150. Alternatively, instead of using such a scanning technique where potentially N comparisons are made for each word or short phrase in the document (where N is the number of entity names in the database), entity identification component 132 may leverage an index to speed up the matching process. Whichever technique is used, if there is a match, then entity identification component 132 identifies the corresponding entity as a potential item.

In a related embodiment, the document that is being analyzed for potential items is pre-processed (e.g., by entity identification component 132) prior to matching the document to known entity names. Example pre-processing steps include removing stop words, correcting misspellings, removing words that are not found in a dictionary, removing punctuation, stemming, and converting any uppercase letters to lowercase letters. Text in other languages may have different pre-processing steps.

Multiple Levels of Granularity

In an embodiment, determining whether to present or suggest a potential item to a user is based on content signals from multiple granularities. Example granularities include a sentence, a phrase, a segment (or text chunk) that comprises multiple sentences and/or phrases, and a document that comprises multiple segments. Instead of modeling the relationship between potential items and documents using content signals from multiple granularities, other approaches rely primarily on attribute features of the potential items themselves outside of the immediate context in which those items appear.

As noted, embodiments are not limited to opportunity postings. Instead, the multi-granularity framework and the individual machine learning techniques described herein may be applied to other types of documents (e.g., news, user profiles, and resumes) and other types of items (e.g., job titles, schools, and companies).

Example Process

Figure 2:
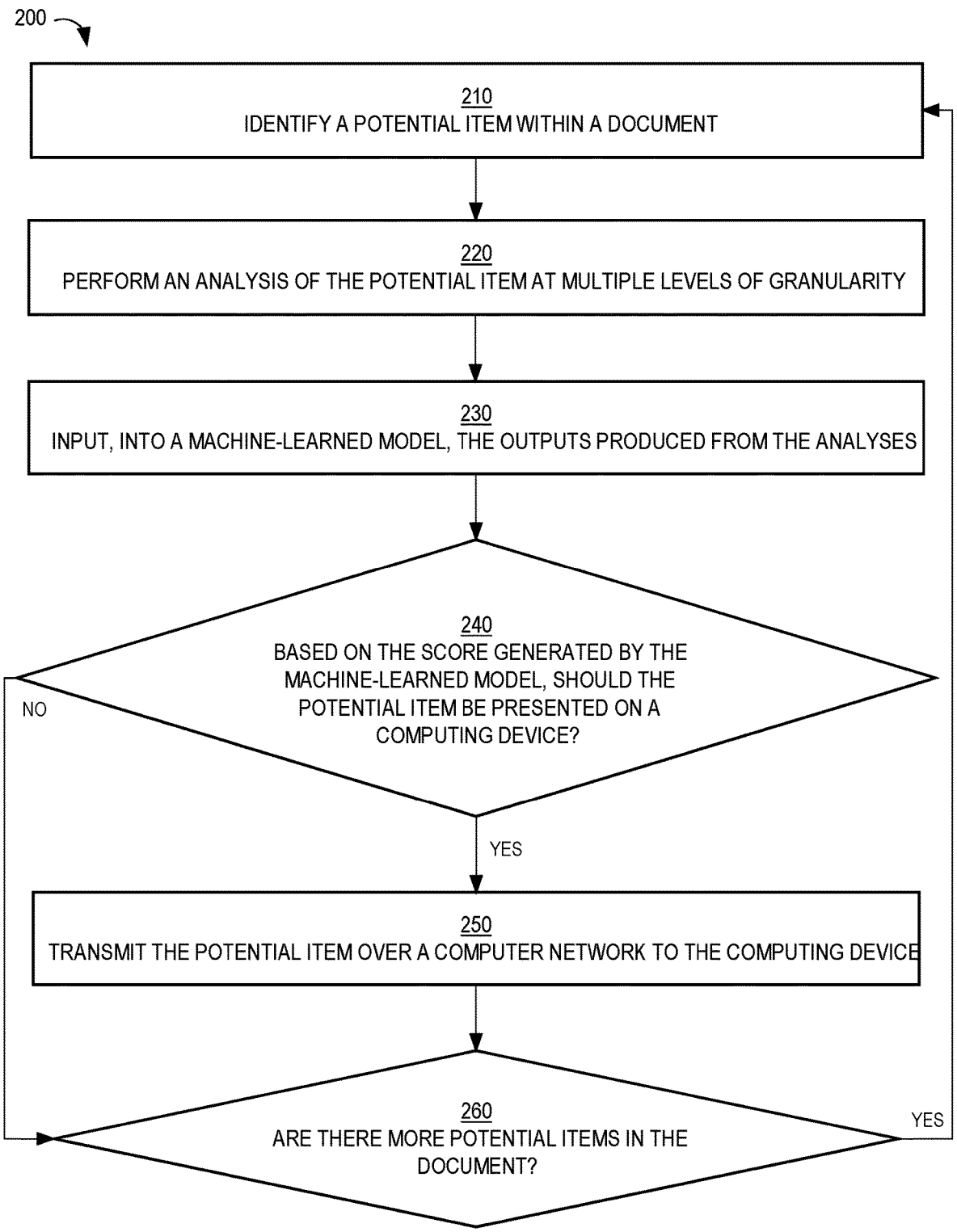
FIG. 2 is a flow diagram that depicts an example process for analyzing a potential item at multiple levels of granularity, in an embodiment.

FIG. 2 is a flow diagram that depicts an example process 200 for analyzing a potential item at multiple levels of granularity, in an embodiment. Process 200 may be implemented by different elements of server system 130.

At block 210, a potential item (e.g., a potential skill) is identified within a document provided by a user. The document comprises multiple segments and multiple sentences. At least one of the segments may include multiple sentences. Block 210 may be performed by entity identification component 132. Block 210 may involve first identifying all possible potential items in the document and then selecting one of them for further processing according to blocks 220-250.

At block 220, analysis of the potential item is performed at multiple levels of granularity. The levels of granularity may include two or more of a sentence level, a segment level, or a document level. For example, block 220 may be performed (e.g., serially or concurrently) by sentence analyzer 134, segment analyzer 138, and document analyzer 142.

For example, analysis at the sentence level may involve identifying an embedding for the potential item, identifying an embedding for a sentence in which the potential item appears, inputting the two embeddings into an encoder, and inputting the output from the encoder into a machine-learned model that generates a probability that the potential item is an appropriate entity to be presented. Embeddings are described in more detail herein.

As another example, analysis at the document level may involve identifying an embedding for the potential item, identifying multiple other items in the document (regardless of entity type), identifying an embedding for each of those other items, comparing the potential item embedding with the embedding of each of the other items, and identifying multiple similarity measures based on the comparison.

At block 230, outputs generated from each of the analyses are input into a machine-learned model (e.g., machine-learned model 146) to generate a score for the potential skill. For example, the probability generated at the sentence level and the multiple similarity measures at the document level are all input to the machine-learned model that has been trained on a set of training samples using one or more machine learning techniques.

At block 240, based on the score, it is determined whether the potential item should be presented on a computing device of the user. Block 240 may be performed by potential item selector 148. If the determination in block 240 is positive (e.g., the model output is above a particular threshold), then process 200 proceeds to block 250; otherwise, process 200 proceeds to block 260.

At block 250, the potential item is transmitted over network 120 to a computing device (e.g., client 110), which causes the potential item to be presented on a display of the computing device. In a related embodiment, the potential item is transmitted to an online account (e.g., an email account or an online network account) that is associated with the computing device or with the user that provided the document.

At block 260, it is determined whether there are any more potential items in the document that have not yet been considered. If so, then process 200 returns to block 210 where another potential item is identified or selected. Otherwise, process 200 ends.

Embeddings

An embedding is a vector of real numbers. "Embedding" is a name for a set of feature learning techniques where words or identifiers are mapped to vectors of real numbers. Conceptually, embedding involves a mathematical embedding from a space with one dimension per word/phrase (or identifier) to a continuous vector space.

One method to generate embeddings includes artificial neural networks. In the context of linguistics, word embedding, when used as the underlying input representation, have been shown to boost performance in natural language processing (NLP) tasks, such as syntactic parsing and sentiment analysis. Word embedding aims to quantify and categorize semantic similarities between linguistic items based on their distributional properties in large samples of language data. The underlying idea that a word is characterized by "the company it keeps."

In an embodiment, an embedding is learned for each of one or more types of items, such as skills, companies, degrees, academic institutions, job titles, industry, seniority, and people. An entity, such as a person or user, may be viewed as a group or collection of items, such as an employer, a school that the user attended, a job title of the user, and a set of skills that the user lists in his/her profile. Values representing an entity may be string values, numeric identifiers, or integers. For example, a value of an entity that corresponds to a company may be a name (e.g., string of non-numeric characters) of the company (e.g., "Company X") or an identifier (e.g., "435256") that uniquely identifies the company relative to other companies listed in a company database (not depicted) that is accessible to server system 130.

In an embodiment, an embedding for each item in a graph of connected items is learned using an unsupervised machine learning technique, such as clustering. In such a technique, an embedding for a particular entity is generated/learned based on embeddings for items to which the particular entity is connected in the graph. The graph may represent an online social network graph of users and their respective attributes. Example attributes of a user include job title, job industry, job function, skills, current employer, past employers, academic institutions attended, academic degrees earned, and other users to which the user is connected in the online social network graph. A connection may be created for a pair of users based on both users providing input confirming that they want to be connected in the online social network graph.

Each embedding represents something different. For example, an embedding for a skill entity represents attributes of users that list that skill in their respective profiles. As another example, if an entity is a content item that is viewable by multiple users, then an embedding for the entity may represent online behavior (e.g., likes, shares, comments, clicks, sign-ups, purchases) of users with respect to the content item.

Sentence-Level Salience

In an embodiment, determining whether to present a potential item to a user is based on the sentence in which the potential item appears or occurs in a document. For example, sentence analyzer 134 retrieves (e.g., from persistent storage) a pre-computed embedding for a potential item identified by entity identification component 132. Each potential item may be associated with an embedding that was generated through a supervised or unsupervised learning process.

Also, sentence identification component 136 identifies the sentence or phrase in which the potential item appears. Sentence identification component 136 may identify a sentence based on certain punctuation that precedes the potential item and that succeeds the potential item. Example punctuation include a period, a semi-colon, a colon, and a carriage return. For example, one sentence in which a first potential item appears may be all text between two periods while another sentence in which a second potential item appears may be all text between two semi-colons. Additionally or alternatively, a sentence may be defined as a series of words, where the first word begins with an uppercase letter and the series of words ends with certain punctuation, such as a period, or ends with a carriage return or a new paragraph character.

Sentence analyzer 134 determines or computes an embedding for the sentence in which a potential item appears. Such an embedding is referred to as a "sentence embedding." A sentence embedding may be generated in response to detecting the potential item and determining that the phrase in which the potential item appears is a sentence.

A sentence embedding may be generated by identifying multiple words or tokens in the sentence and, for each word/token, retrieving an embedding that corresponds to that word/token and aggregating the retrieved embeddings to generate a sentence embedding. Example aggregation operations include mean pooling, median pooling, and max pooling. Additionally, a supervised, machine-learned model may be used to perform the aggregation.

The token embeddings may have been learned from the same text corpus from which the potential item embeddings were generated/learned. Alternatively, the text corpus from which the token embeddings were learned may be different from the text corpus from which the potential item embeddings were learned; however, the same or similar machine learning process may be used to learn both sets of embeddings.

Sentence analyzer 134 uses the potential item embedding and the sentence embedding to determine a probability or likelihood that a user will select the corresponding potential item if the potential item is presented to the user. The potential item embedding and the sentence embedding may be used or considered in multiple ways. For example, a logistic regression model is trained to learn the relationship between potential item embeddings and sentence embeddings. The training data upon which the logistic regression model is trained comprises multiple training instances or samples, each instance comprising a potential item embedding, a sentence embedding, and a label that indicates whether a user (e.g., an opportunity poster) to which the corresponding potential item was presented in the past was selected by that user.

For example, server system 130 records (a) a history of poster-potential item interactions where different potential items are presented to different posters (e.g., operating clients 110-114) and (b) whether a poster selected a presented potential item. If a poster selects a particular potential item (or at least does not remove a particular potential item), then a positive sample or training instance is created that includes (1) the particular potential item (or an identity or embedding thereof), (2) a sentence or phrase in which the particular potential item appears (or an embedding thereof, which embedding may be generated sooner after the sentence is identified), and (3) a label indicating that the particular potential item was selected by the poster, or at least not removed by the poster. Similarly, if a poster does not select a presented potential item (or explicitly removes the presented potential item), then a negative sample or training instance is created that includes (1) the presented potential item (or an identity or an embedding thereof), (2) a sentence or phrase in which the presented potential item appears (or an embedding thereof), and (3) a label indicating that the presented potential item was not selected (or was explicitly removed) by the poster. If multiple potential items are presented to a single poster, then the same number of training instances may be generated, where the number of positive training instances is equal to the number of potential items that the poster selected (or did not remove), and the number of negative training instances is equal to the number of potential items that the poster did not select for inclusion (or selected for exclusion).

In a related embodiment, to estimate the salience of a potential item at the sentence level, a neural network model (which is in place of, or alternative to, the logistic regression model described previously) is built and trained to learn the salience by modeling the sentence that contains the potential item and the potential skill itself. The model may be defined as:

$$Pr(s|c_{sent}) = \sigma(W^* f_{encoder}(c_s, c_{sent}) + b)$$

where $\sigma(x) = 1/(1+\exp(-x))$, s is a potential item, $c_s$ is the potential item's text, $c_{sent}$ is the sentence containing the potential item (or the mention thereof), and $f_{encoder}$ is a text-to-embedding encoder. This embodiment is not limited to the type of encoder that may be used. Example encoders including FastText, Universal Sentence Encoder (USE), and BERT (Bidirectional Encoder Representations from Transformers). FastText is a library for the learning of word embeddings and text classification created by the FAIR lab. The model allows a developer to create an unsupervised learning or supervised learning algorithm for obtaining vector representations for words. For FastText and USE, the potential item and sentence are encoded separately and then the concatenated embedding is used as the encoder output.

For BERT, both the potential item embedding and the sentence embedding are input to the model and the embeddings generated by BERT are selected as the encoder output.

Sentence-Level Salience: Example Process

Figure 3:
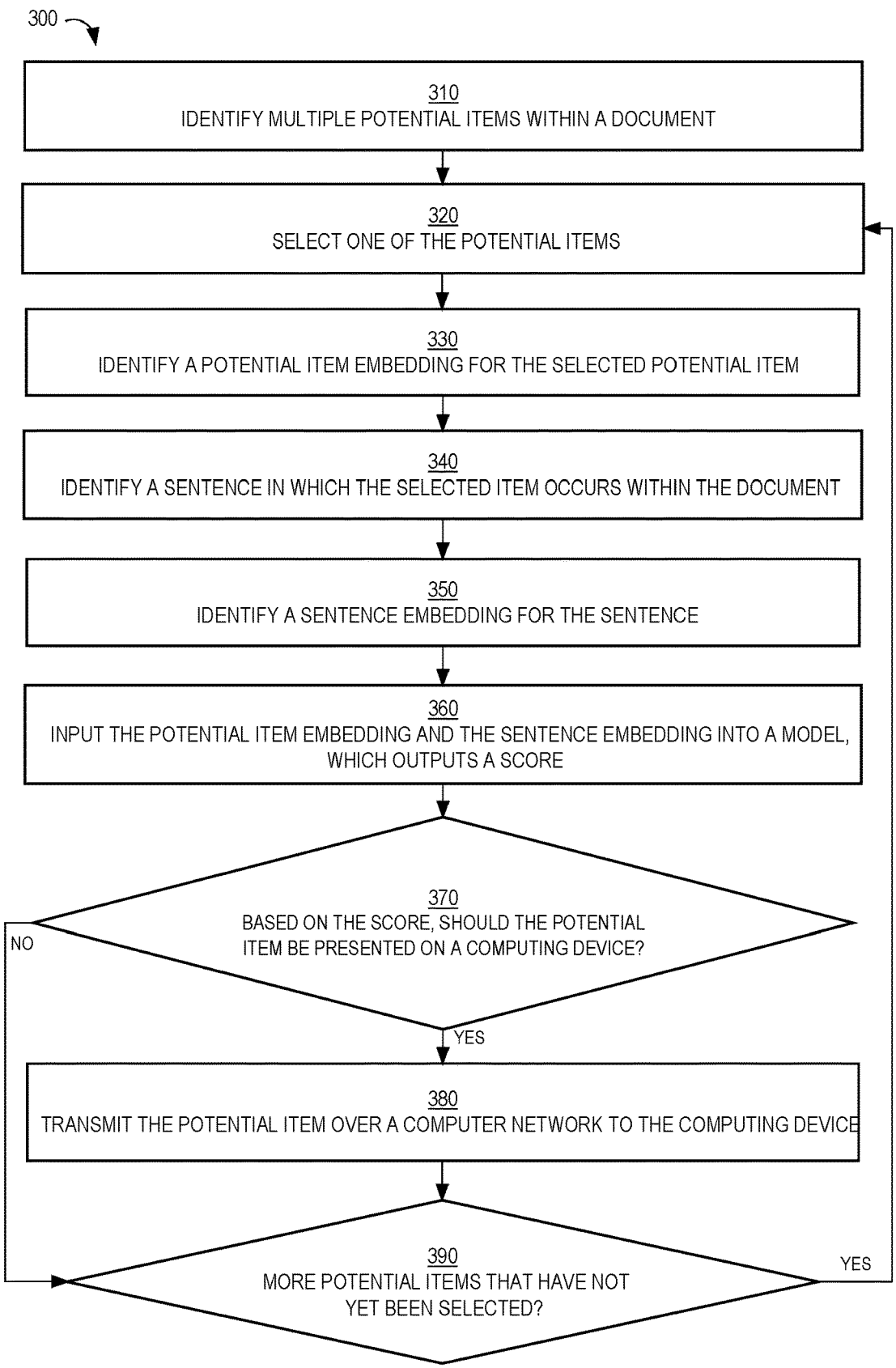
FIG. 3 is a flow diagram that depicts an example process for analyzing a potential item at a sentence level, in an embodiment.

FIG. 3 is a flow diagram that depicts an example process 300 for analyzing a potential item at the sentence level, in an embodiment. Process 300 may be implemented, at least partially, by sentence analyzer 134.

At block 310, multiple potential items are identified within a document. The document may be received over a computer network from a client device, such as client 110. The potential items may be limited to a particular type of entity, such as skill. Block 310 may be preceded by a pre-processing step to remove characters or words from the original document. Block 310 may involve comparing each word or token (or series of two or more consecutive words/tokens) to a set of known potential items. If there is a match to a known potential item, then that potential item is identified for purposes of further processing.

At block 320, one of the identified potential items is selected. The potential item that is selected in block 320 may be the first (or last) potential item identified within the document. Alternatively, the potential item selection may be random.

At block 330, a potential embedding for the selected potential item is identified. Block 330 may involve looking up the selected potential item in a table or key-value store and retrieving a corresponding embedding.

At block 340, a sentence in which the selected potential item occurs in the document is identified. Block 340 may involve identifying certain punctuation that precedes and succeeds the selected potential item and identifying all the text (or words/tokens) in between as the sentence.

At block 350, a sentence embedding for the sentence is identified. Block 350 may involve identifying words or keywords in the sentence and, for each identified (key)word, looking up an embedding for that (key)word. Such embeddings are aggregated to generate a sentence embedding.

At block 360, the potential embedding and the sentence embedding are input into a (e.g., machine-learned) model, which outputs a score. The model may be trained using one or more machine learning techniques.

At block 370, based on the score, it is determined whether to cause the potential item to be presented on a computing device, such as a computing device of a user that provided the document. The score may be just one of multiple scores that are used to make the determination. If the determination is positive, then process 300 proceeds to block 380; otherwise, process 300 proceeds to block 390.

At block 380, the potential item is transmitted over network 120 to the computing device (e.g., client 110), which causes the potential item to be presented on a display of the computing device. In a related embodiment, the potential item is transmitted to an online account (e.g., an email account or an online network account) that is associated with the computing device or with the user that provided the document.

At block 390, it is determined whether there are any more potential items that have not yet been considered. If so, then process 300 returns to block 320. Otherwise, process 300 ends.

Process 300 may repeat for each new version of a document. For example, a first iteration of process 300 is performed for a first version of a document and a second iteration of process 300 is performed for a second version of the document. The difference between the two versions may be the addition or removal of one or more words or tokens. In this way, a set of potential items that is presented to a user that provides the document may be continually updated as words are added or removed from the document.

Segment-Level Salience

In an embodiment, determining whether to suggest a potential item to a user is (e.g., also) based on a segment of a document (provided by the user) in which the potential item appears or occurs. A document comprises one or more segments. Each segment is associated with a type of content. In the context where the document is an opportunity posting, example segments (and, therefore, types of content) include benefits, company description, responsibilities, qualifications, work rights, contact, location, work schedule, disclaimer, and summary. In the context where the document is a resume, example segments include career objective/goal, work summary, job summary, academic history, skills, and publications. In the context where the document is a news article, example segments include title, synopsis or summary, background, details, expert analysis, and conclusion.

Documents of the same type (e.g., opportunity postings) are not required to have the same number or types of segments. For example, one opportunity posting may have five segments while another opportunity posting may have three segments. The latter opportunity posting might not have a segment of a particular type (e.g., a benefits segment).

A single document may have multiple segments of the same type. For example, one resume may have three job summaries while another resume may have only one job summary.

Segment-Level Salience: Chunk Identification

In order to identify segments within a document, server system 130 (or segment analyzer 138) analyzes the document for one or more text chunks. A text chunk comprises one or more sentences, some of which may be incomplete sentences. One or more text chunk identification criteria are used to identify each chunk. Example chunk identification criteria include a section of text that ends in a carriage return or that ends in a new paragraph character. For example, if a section of text is bounded by carriage returns, then that section of text is considered a chunk. Each identified chunk may be given an identifier that uniquely identifies the chunks relative to other chunks in the same document.

Another example of text chunk identification criteria includes a section of text that begins with a particular pre-defined heading or phrase. Thus, if a section of text begins with a pre-defined heading or phrase in a set of pre-defined headings/phrases, then the section of text is a beginning of a new chunk and the text that immediately precedes that section of text becomes (or is) the end of a previous chunk.

Segment-Level Salience: Chunk-to-Segment Assignment

Once a set of text chunks is identified in a document (e.g., an opportunity posting), each text chunk is evaluated to determine to which segment the text chunk should be assigned. Such evaluation and assignment may be performed by segment identified component 140. A text chunk may be assigned to, or associated with, multiple segments, especially if it is unclear which segment the text chunk should be assigned to. One or more segment identification criteria may be used to identify a segment for a text chunk. For example, each segment may be associated with a set of pre-defined phrases or keywords. If a text chunk includes one or more phrases or keywords from a set corresponding to a particular segment, than the text chunk is assigned to that particular segment. If a text chunk includes one or more phrases or keywords from different sets corresponding to different segments, then the text chunk is assigned to each of those segments. Alternatively, the text chunk is assigned to the segment whose pre-defined phrases or keywords are found the most in the text chunk relative to other segments.

As another example of segment identification criteria, instead of relying on text matching to identify one or more segments to which a text chunk is to be assigned, embeddings are used. For example, words or tokens are extracted from a text chunk. Some of the words or tokens may be disregarded, such as stop words and misspelled words (or misspelled words may be corrected and used, if a correction is available). An embedding is retrieved for each identified token. The embeddings of all the tokens identified in a text chunk are combined or aggregated to generate an aggregated embedding. Examples of aggregation operations on embeddings include mean pooling, median pooling, and max pooling. Thus, an aggregated embedding is generated for each text chunk identified in a document. For each aggregated embedding, the aggregated embedding is compared to one or more (pre-established) representative embeddings of each possible segment. A representative embedding for a segment may be generated based on one or more text chunks that are known (e.g., human labeled) to be associated with the segment. One or more embedding comparison operations may be used, such as cosine similarity and dot product. If an aggregated embedding of a text chunk is similar (or most similar) to a representative embedding of a segment, then the text chunk is associated with (or assigned to) the segment. "Similarity" may be defined based on a pre-defined threshold and depends on the similarity operation used. However, an aggregated embedding may be similar to multiple segments in this case, which may be acceptable. Alternatively, "similarity" may be defined as the segment(s) whose representative embedding(s) is/are closest (relative to representative embeddings(s) of other segments) to the aggregated embedding in question.

In some situations, when entering a document, a user provides the text into multiple pre-defined text fields and each pre-defined text field is associated with a particular segment. Thus, any text within a particular text field is automatically associated with the segment that corresponds to that particular text field.

Segment-Level Salience: Entity-to-Segment Assignment

Once each text chunk is assigned to a segment, items of a particular type (e.g., skill) are grouped based on the segment in which the items are assigned. (The following steps may be performed by segment analyzer 138.) For example, chunk A includes items 1, 2, and 3, chunk B includes items 4 and 5, and chunk C includes items 6, 7, and 8. Chunk A is assigned to segment X, chunk B is assigned to segment Y, and chunk C is assigned to segment Z. A segment embedding is generated for each segment. The segment embedding for a segment is generated based on embeddings of the items of the particular type that appear in that segment (or the text chunk corresponding to the segment). For example, embeddings of items 1, 2, and 3 are combined (or aggregated) to generate a segment embedding for segment X, embeddings of items 4 and 5 are combined (or aggregated) to generate a segment embedding for segment Y, and embeddings of items 6, 7, and 8 are combined (or aggregated) to generate a segment embedding for segment Z. Example operations to generate the segment embedding include mean pooling, median pooling, and max pooling.

After the segment embeddings are generated for the segments of a document, an embedding of a potential item of a particular type (e.g., skill) from the document is compared to each segment embedding to determine with which segment to associate the potential item. A document may include multiple potential items of the particular type. Also, each potential item may be represented with an entity embedding that was used to generate one of the segment embeddings.

Example operations to compare a potential item embedding to a segment embedding include cosine similarity, dot product, and distance.

The output of each operation (corresponding to each segment) may be used to select a segment. For example, comparing a potential item's embedding to five segment embeddings results in five scores. The potential item is assigned to the segment associated with the highest score. In a related example, the potential item is assigned to the segment whose score is above a particular threshold value. Thus, the potential item may be assigned to multiple segments.

In an embodiment, the output of comparing a potential item's embedding to each segment embedding is input to a machine-learned model that produces output that is used to determine whether to present the potential item to a user, for example, who provided/entered/uploaded the document that includes the potential item. The input to the machine-learned model may be the identity of the segment(s) whose score(s) are the highest relative to the scores of the other segments. Alternatively, the input may be all the scores, ordered according to a pre-defined segment order of the machine-learned model. Thus, if there are five segments, then the input is a set of five ordered scores, where the first score corresponds to a first particular segment, the second score corresponds to a second particular segment, and so forth.

In an alternative embodiment, the output of comparing a potential item's embedding to each segment embedding is used to directly determine whether to present the potential item to a user. For example, multiple segments are ranked in order of importance. Each potential item of the particular type is scored in the manner disclosed herein. If a potential item is associated only with highly ranked segments, then the potential item is more likely to be presented as a potential item to the user. Conversely, if a potential item is associated only with lower ranked segments, then the potential item is less likely to be presented as a potential item to the user. The number of potential items that are presented to a user may be capped, for example, to ten. If two potential item are associated with the same segment(s), then the potential item whose score with the higher ranked segment is higher than the score of the other potential item is more likely to be presented as a potential item.

Segment-Level Salience: Example Process

Figure 4A:
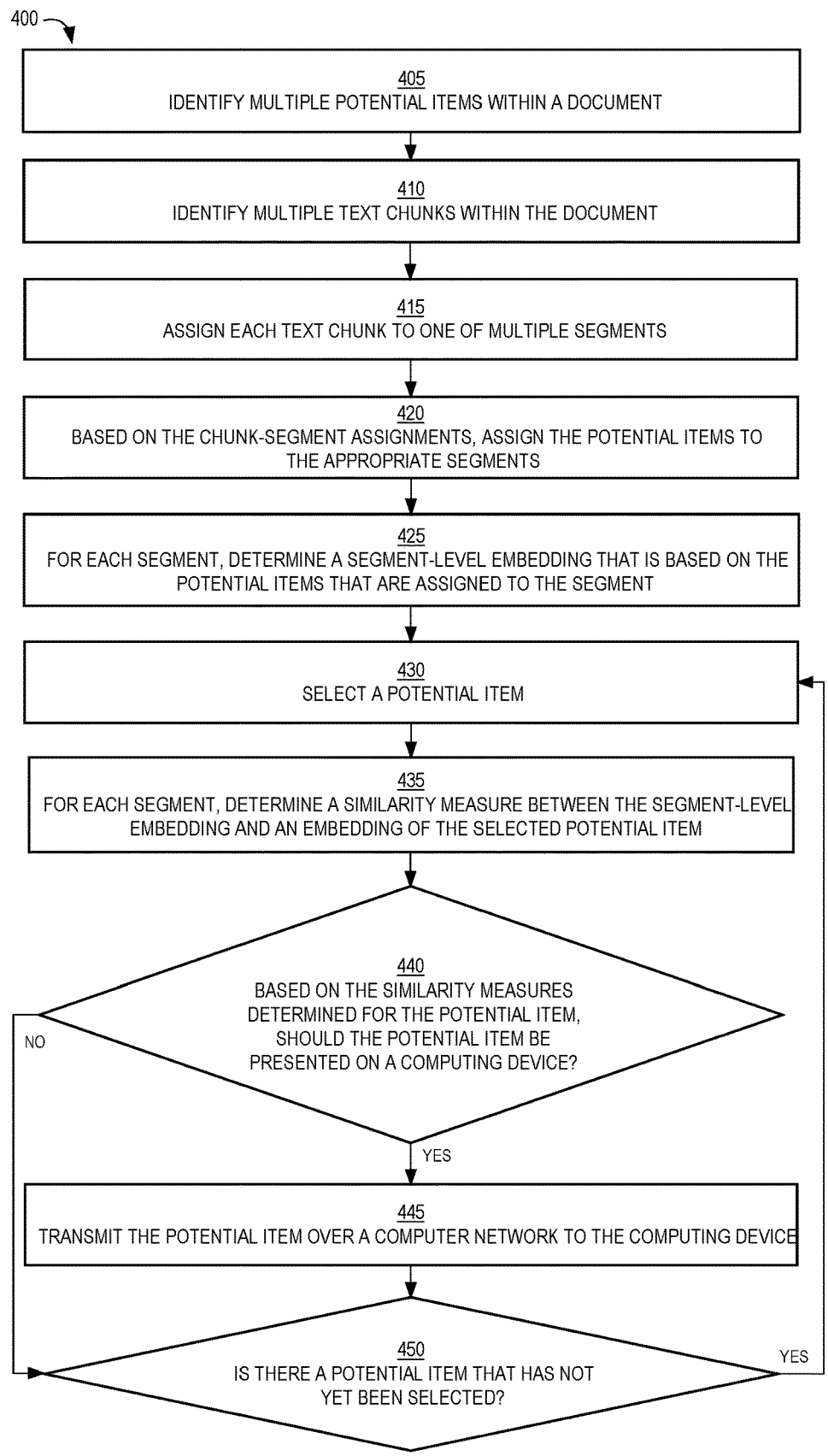
FIG. 4A is a flow diagram that depicts an example process for analyzing a potential item at a segment level, in an embodiment.
Figure 4B:
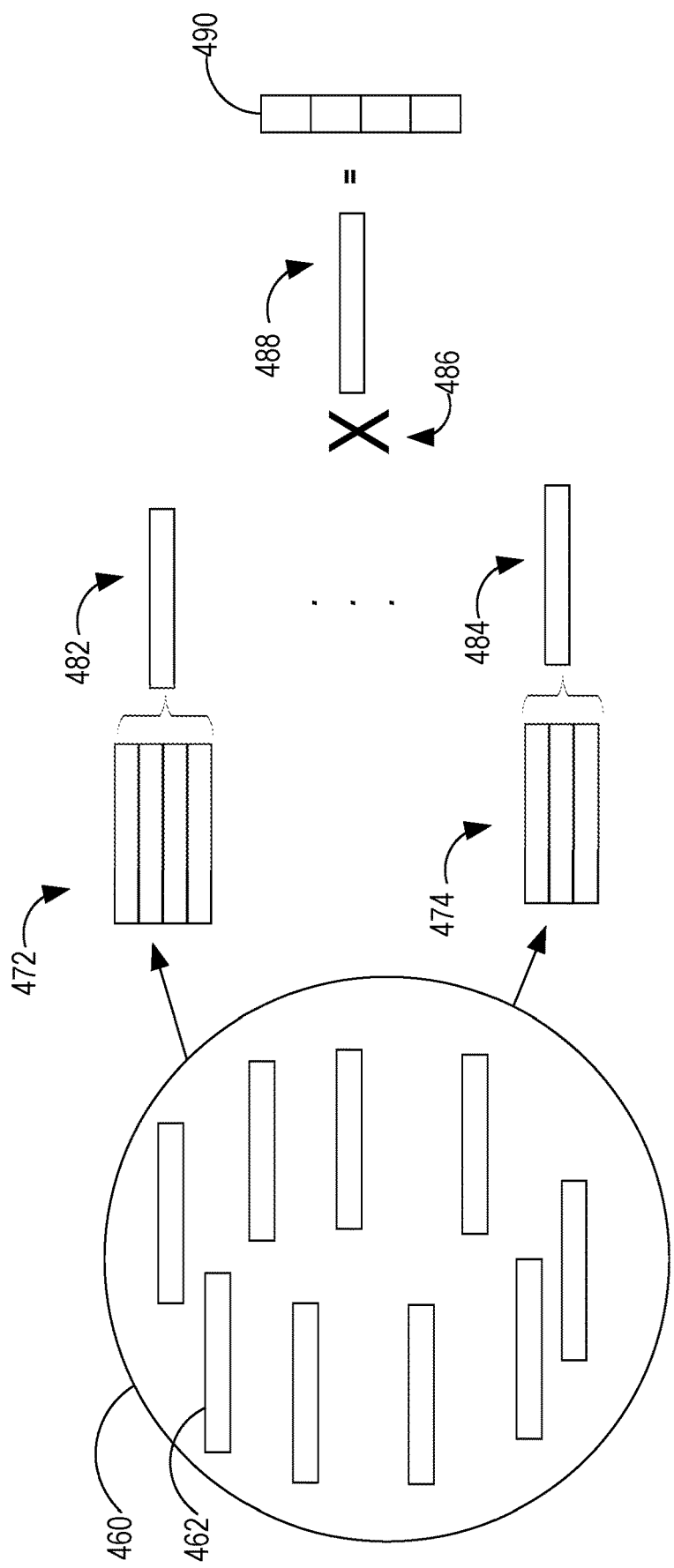
FIG. 4B is a block diagram that depicts some of the elements referenced in the flow diagram of FIG. 4A, in an embodiment.

FIG. 4A is a flow diagram that depicts an example process 400 for analyzing a potential item at the segment level, in an embodiment. Process 400 may be implemented, at least partially, by segment analyzer 138. FIG. 4B is a block diagram that depicts elements that are referenced in process 400.

At block 405, multiple potential items are detected in a document. The potential items may be limited to a particular type of entity, such as skills. In FIG. 4B, such potential items are represented as embeddings inside circle 460. One of those embeddings is embedding 462, which corresponds to one of the multiple potential items.

The document in which the potential items are detected may be received over network 120 from client 110 that a first user operates. The document may have been composed by the first user while client 110 was communicatively coupled to server system 130. Alternatively, the document may have been composed by another user, but selected by the first user for uploading to server system 130.

At block 410, multiple text chunks are identified within the document. For example, text chunks are identified based on carriage returns and/or new paragraph characters.

At block 415, each identified text chunk is assigned to one of multiple segments. As a result of block 415, at least one identified text chunk is assigned to one segment and another identified text chunk is assigned to another segment. Multiple text chunks may be assigned to the same segment.

At block 420, based on the chunk-segment assignment, the potential items are assigned to the appropriate segments. For example, if potential item A is found in text chunk B that is assigned to segment C, then potential item A is also assigned to segment C. Because text chunk B includes potential item A, segment C may also be said to include potential item A.

In FIG. 4B, embedding 472 (which come from circle 460) are assigned to one segment and embedding 474 (which come from circle 460) are assigned to another segment. In some documents, there may be more than two segments, in which case there may be an embedding like embeddings 472 and 474 for each additional segment.

At block 425, for each segment, a segment-level embedding that is based on the potential items that are assigned to that segment is determined. Block 425 may involve aggregating embeddings of the potential items assigned to the segment to generate the segment-level embedding. In FIG. 4B, segment-level embedding 482 is generated based on embeddings 472, while segment-level embedding 484 is generated based on embeddings 474.

At block 430, a potential item is selected. The potential item that is selected may correspond to the first potential item detected in the document. Alternatively, the potential item may be randomly selected from the available potential items.

At block 435, for each segment, a similarity measure between the segment-level embedding of that segment and an embedding for the potential item is determined. Thus, after block 435, multiple sets of similarity measures or scores are generated, one set for each potential item. Therefore, if there are four segments, then four similarity measures or scores are generated.

In FIG. 4B, embedding 488 is the embedding for the potential item selected in block 425. Operation 486 is the operation that takes, as input, embedding 488 and a segment-level embedding (e.g., segment-level embedding 482) and generates, as output, a similarity measure, which is inserted into an entry of output array 490. In the depicted example, output array 490 comprises four entries, indicating that four segments were detected and four segment-level embeddings were generated. However, in other examples, more or less segments may have been identified in the document.

At block 440, based on the similarity measures (e.g., in output array 490) determined for the potential item based on the multiple segments, it is determined whether the potential item is to be presented on a computing device. The computing device may be operated by a user that provided the document to server system 130. Block 440 may involve inserting the similarity measures into a machine-learned model that has been trained based on past similarity measures and positive and/or negative training samples indicating whether the corresponding potential items were selected or confirmed by a user. If the result of the determination in block 440 is positive, then process 400 proceeds to block 445. Otherwise, process 400 proceeds to block 450.

At block 445, the potential item is transmitted over network 120 to, for example, client 110, which causes the potential item to be presented on a display of the computing device. In a related embodiment, the potential item is transmitted to an online account (e.g., an email account or an online network account) that is associated with the computing device or with the user that provided the document.

At block 450, it is determined whether there are any more potential items that have not yet been considered. If so, then process 400 returns to block 430. Otherwise, process 400 ends.

Document-Level Salience

In an embodiment, determining whether to present a potential item to a user is based on how similar the potential item is to other items in the same document or set of text. The other items are items of multiple types, one or more of which are different than the type of the potential item. Items of the other types might not be candidates for presentation/suggestion. In the context of opportunity postings, the potential item's type may be skill while other types may include job titles, job function, job industry, and seniority.

In an embodiment, entity identification component 132 identifies multiple types of items, not just one type of entity, such as skills. Alternatively, server system 130 includes (though not depicted) different components for different types of items. For example, server system 130 includes a job title identification component that identifies names of job titles within opportunity postings, an organization identification component that identifies names of organizations within opportunity postings, an academic degree identification component that identifies names of academic degrees within opportunity postings, a job industry identification component that identifies names of job industries within opportunity postings, and a credential or certification identification component that identifies names of credentials or certifications within opportunity postings.

Determining document-level salience may be performed by document analyzer 142. Determining similarity between the potential item and other items in the same document may include comparing an embedding of the potential item with an embedding of another entity. Example embedding similarity operations include cosine similarity, dot product, and a distance measure. For cosine similarity, the possible value range is between −1 and 1, where 1 indicates a perfect match. For dot product, there is no boundary on the possible value range; however, the higher the value, the more similar the two embeddings. For a distance measure, the possible value range is 0 and greater, where 0 indicates an exact match.

A result of determining the similarity may be multiple similarity scores, one for each other entity found in the document. Alternatively, the multiple similarity scores may be the highest similarity score, the lowest similarity score, and the average similarity score. Such a result of multiple similarity scores may be input into the machine-learned model (referenced previously). Alternatively, an aggregated (e.g., average or median) similarity score may be computed from the multiple similarity scores and that aggregated similarity score is input to the machine-learned model.

Document-Level Salience: Example Process

Figure 5A:
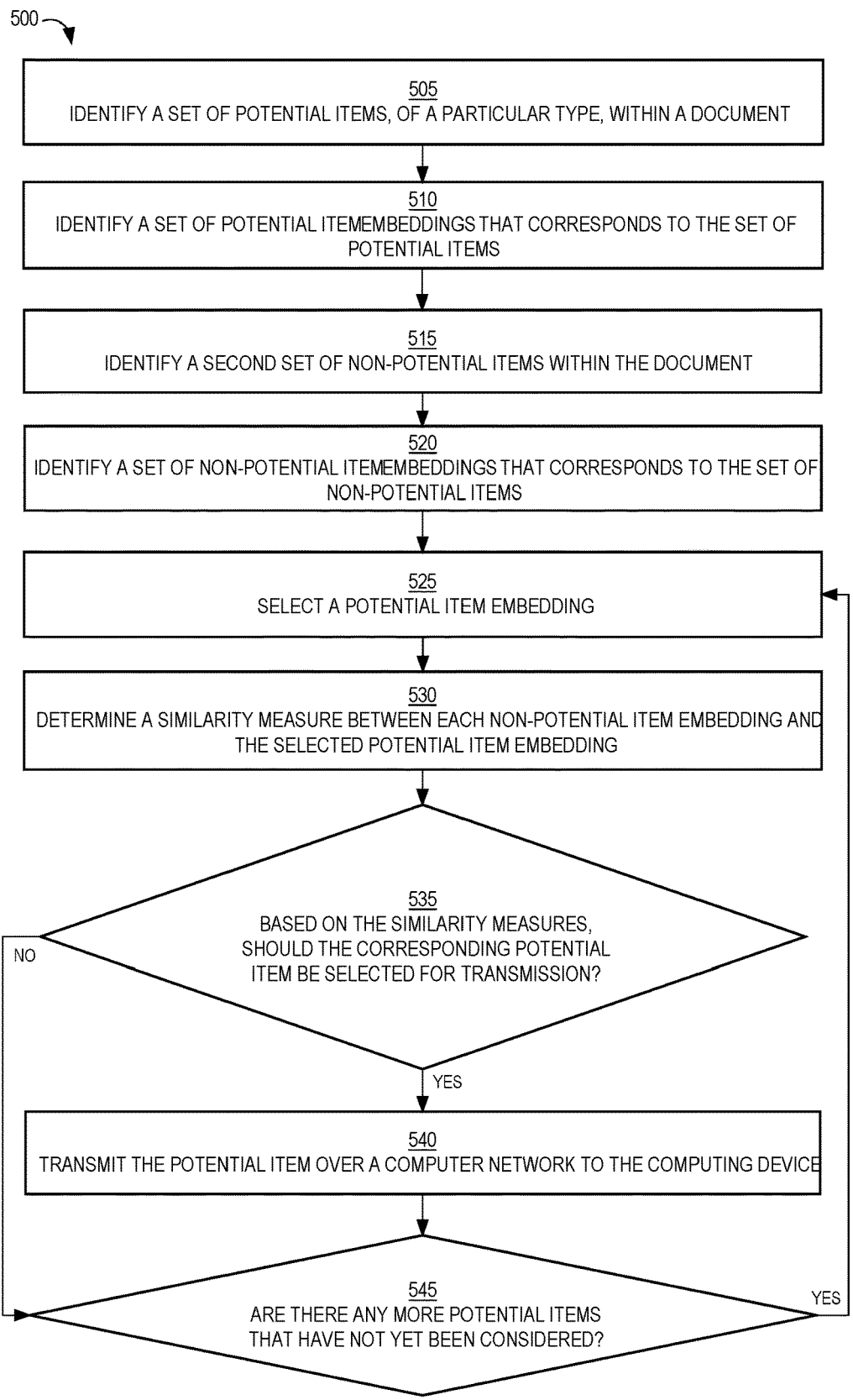
FIG. 5A is a flow diagram that depicts an example process for analyzing a potential item at a document level, in an embodiment.
Figure 5B:
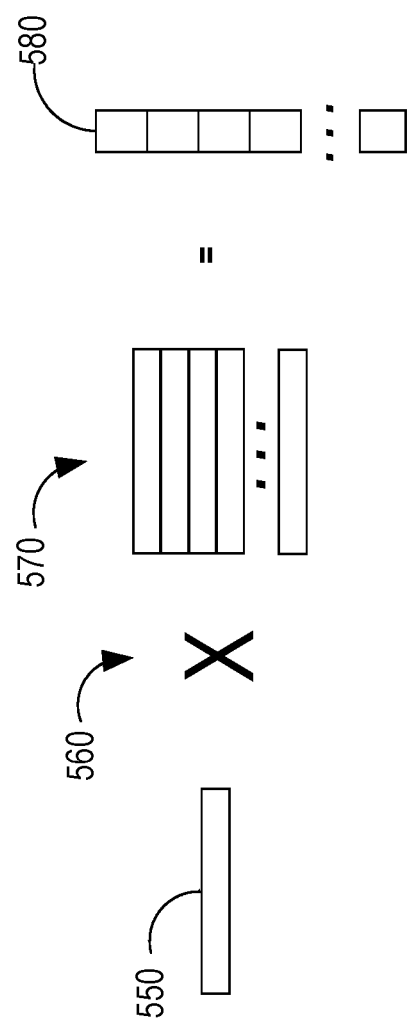
FIG. 5B is a block diagram that depicts some of the elements referenced in the flow diagram of FIG. 5A, in an embodiment.

FIG. 5A is a flow diagram that depicts an example process 500 for analyzing a potential item at the document level, in an embodiment. Process 500 may be implemented, at least partially, by document analyzer 142. FIG. 5B is a block diagram that depicts elements that are referenced in process 500.

At block 505, a set of potential items, of a particular type, included within a document is identified. For example, the set of potential items is a set of potential skills.

At block 510, a set of potential item embeddings is identified. Each potential item embedding corresponds to a potential item in the set of potential items.

At block 515, a set of non-potential items included within the document is identified. Each non-potential item in the set is of a type that is different than the particular type. For example, such types may include a job title, a company, an industry, or any identified keyword that is not considered to be of the particular type (e.g., skill).

At block 520, a set of non-potential item embeddings is identified. Each non-potential item embedding corresponds to a non-potential item in the set of non-potential items. In FIG. 5B, embeddings 570 represent the set of non-potential item embeddings.

At block 525, a potential item embedding is selected. The potential item embedding that is selected may correspond to the first potential item identified in the document. Alternatively, the potential item embedding may be randomly selected from the available potential item embeddings. In FIG. 5B, embedding 550 represents the selected potential item embedding.

At block 530, a similarity is determined between the potential item embedding and each non-potential item embedding. Block 530 may involve determining (or generating) multiple similarity measures if there are multiple non-potential items. Thus, if there are three non-potential items, then three similarity measures are determined.

In FIG. 5B, operation 560 takes, as input, embedding 550 and embeddings 570 and generates, for each embedding in embeddings 570, a similarity measure. The similarity measures are embodied in output array 580.

At block 535, based on the similarity measures determined in 530, it is determined whether the potential item (corresponding to the selected potential item embedding) is to be presented on a computing device, for example, of a user the provided the document. For example, in the case of a single similarity measure, if the similarity measure is above (or below, depending on the type of embedding similarity operation) a pre-defined threshold, then the determination is positive. In the case of multiple similarity measures, if a certain percentage (e.g., more than 50%) of the similarity measures are above (or below) the pre-defined threshold, then the determination is positive. Similarly, if an average or median of the similarity measures are above (or below) the pre-defined threshold, then the determination is positive.

Block 535 may involve inputting each similarity measure or score into a machine-learned model (e.g., model 146), which outputs a score. The machine-learned model may be trained on training data that comprises multiple training instances, each comprising a single similarity measure and a label indicating whether the potential item should be presented. Alternatively, each training instance may comprise multiple similarity measures, such as a maximum similarity measure, a median similarity measure, and a minimum similarity measure. A threshold score may be tuned (automatically or manually) to ensure maximum precision, minimum recall, or a tradeoff between (a) a maximum precision given a minimum pre-defined recall or (a) a maximum recall given a minimum pre-defined precision.

If the determination in block 535 is positive (e.g., the model output is above a particular threshold), then process 500 proceeds to block 540; otherwise, process 500 proceeds to block 545.

At block 540, the potential item that corresponds to the potential item embedding (selected in block 550) is transmitted over network 120 to the computing device (e.g., client 110), which causes the potential item to be presented on a display of the computing device. Block 580 may be performed only after all potential item embeddings have been considered. In a related embodiment, the potential item is transmitted to an online account that is associated with the computing device or with the user that provided the document.

At block 545, it is determined whether there are any more potential item embeddings that have not yet been considered. If so, then process 500 returns to block 525. Otherwise, process 500 ends.

Scoring a Potential Item

In an embodiment, multiple features related to a potential item extracted or identified in a document are used to determine whether to present the potential item to a user. Values of the various features of the potential item are used to generate a score for the potential item. The score may be an output from machine-learned model 146, which may have been generated by model generator 144. Multiple feature values related to the potential item are input into machine-learned model 146. Example machine learning techniques to generate the machine-learned model include XGBoost, logistic regression, and support vector machines.

In an embodiment, one or more of the outputs referenced previously are input to the machine-learned model. For example, an output from sentence analyzer 134, an output from segment analyzer 138, and an output from document analyzer 142 are input to machine-learned model 146. As another example, the machine-learned model only takes a strict subset of these three outputs.

As another example, model generator 144 trains machine-learned model 146 on additional features, such as those features described in reference to the skill scoring model in U.S. patent application Ser. No. 16/443,608, which is incorporated by reference as if fully disclosed herein. The additional features for machine-learned model 146 may be features of the skill scoring model described in U.S. patent application Ser. No. 16/443,608 or may be output of the skill scoring model.

Training machine-learned model 146 involves learning coefficients or weights for each of the input features, such as outputs from the three analyzers. For example, each training instance that is used to train machine-learned model 146 includes multiple feature values corresponding to an entity that was selected or rejected, which feature values may be values generated, respectively, by sentence analyzer 134, segment analyzer 138, and/or document analyzer 142. Thus, training the model will cause a coefficient to be learned for each of these input features. Some input features will have more predictive power than other input features. For example, output from sentence analyzer 134 may have more predictive power than output from either of segment analyzer 138 or document analyzer 142. The predictive power of an input feature is reflected in the magnitude of the coefficient that corresponds to that input feature. In other words, the greater the value of a coefficient, the greater the predictive power of the corresponding input feature.

Potential Item Selection

Whatever type of model is trained and used to generate a score of a potential item, that score is used to determine which potential item to select for presentation to the user that created, authored, or uploaded the document in which the potential item appeared. Potential item selection is performed by potential item selector 148. Potential item selector 148 selects one or more potential items based on one or more selection criteria. For example, potential item selector 148 automatically selects the top N (e.g., ten) potential items in terms of score. As another example, potential item selector 148 selects all potential items that have a score above a particular threshold (e.g., 0.8). This means that, in some instances, no potential item from a document is selected because all potential items from that document have scores below the particular threshold. In other instances, potentially many potential items are selected because many potential items have scores above the particular threshold. As another example, a minimum number of potential items (e.g., three) are selected even though all potential items have scores below the particular threshold.

Potential Item Presentation

A selected potential item is transmitted to a user from server system 130 over network 120 to a computing device of the user, such as client 110. Potential item selector 148 or another element of server system 130 may perform the transmission.

The score of a potential item may dictate where the potential item is displayed on a computer display of the computing device. For example, potential items with relatively higher scores may be presented first or more prominently than potential items with relatively lower scores.

In an embodiment, even though a potential item that is presented to a user is not selected by the user, that potential item is still associated with the corresponding document. For example, if the score of a potential item is above a relatively high threshold (e.g., 0.95) (indicating a high degree of confidence), then that potential item is automatically associated with the document, regardless of whether the user selected the potential item. There may be multiple reasons why the user did not select the potential item, such as not actually viewing the potential item, misreading the potential item, not immediately understanding the importance of the potential skill, and not understanding the display of the potential skills.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
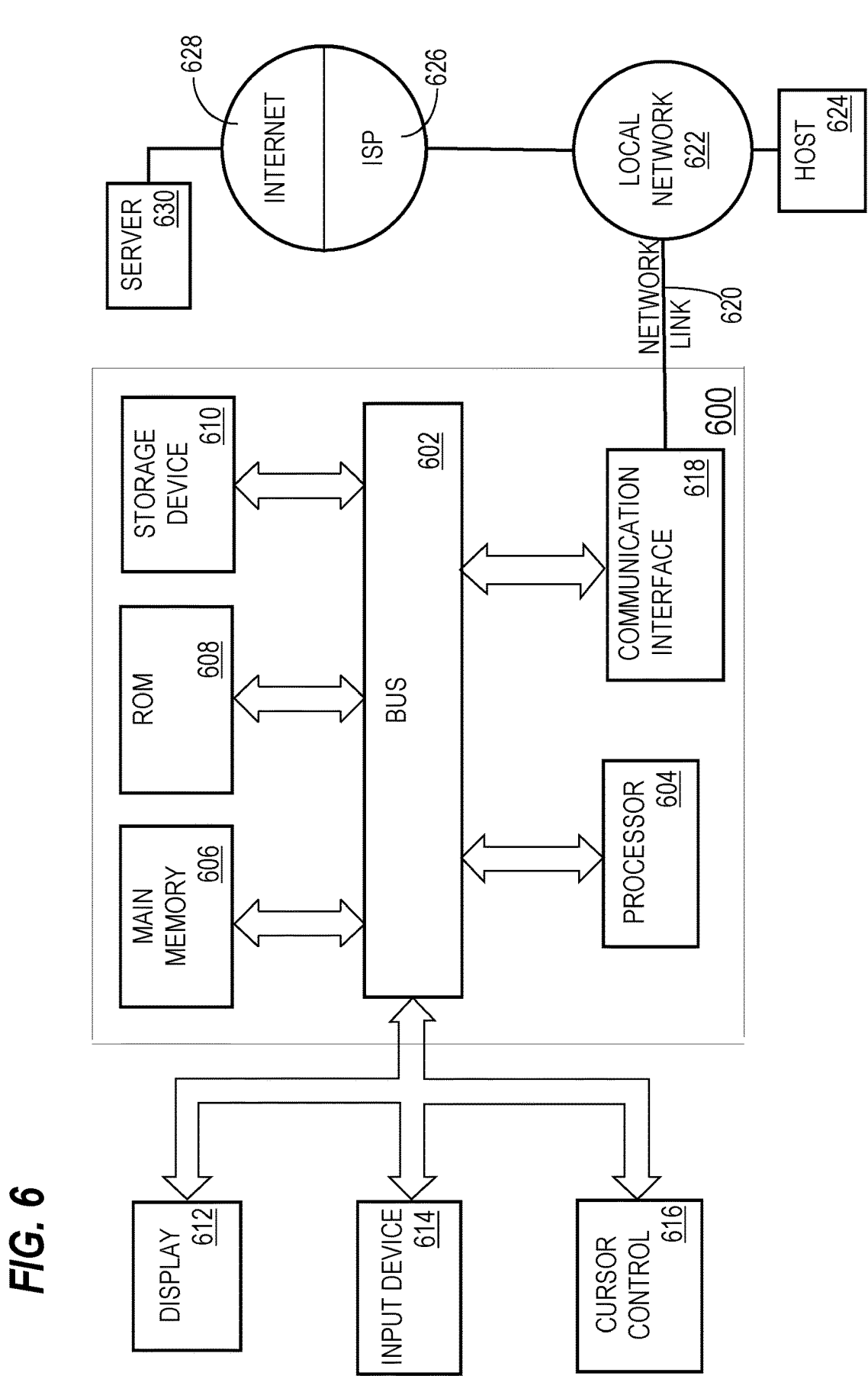
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, performed by one or more computing devices, comprising:
    identifying a potential item within a document, which includes a plurality of segments and a plurality of sentences, wherein at least one segment of the plurality of segments includes multiple sentences of the plurality of sentences;
    performing an analysis of the potential item at a plurality of levels of granularity that includes two or more of a sentence level, a segment level, or a document level;
    producing a plurality of outputs based on performing the analysis of the potential item at the plurality of levels of granularity, the plurality of outputs including an output for each level of granularity in the plurality of levels of granularity;
    inputting the plurality of outputs into a machine-learned model to generate multiple sets of scores for the potential item based on the level of granularity of the potential item;
    causing the potential item to be presented on a computing device based on a score of the multiple set of scores exceeding a predefined threshold; and
    in response to user selection of the potential item while the potential item is presented on the computing device, creating an association between the potential item and the document.

2. The method of claim 1, wherein:
    the plurality of levels of granularity include the sentence level;
    performing the analysis of the potential item at the sentence level comprises:
    identifying, in the document, a sentence in which the potential item occurs;
    identifying a potential embedding for the potential item;
    identifying a sentence embedding for the sentence; and
    generating an output of the plurality of outputs based on the potential embedding and the sentence embedding.

3. The method of claim 2, wherein generating the output comprises:
    inputting the potential embedding and the sentence embedding into an encoder that produces preliminary output; and inputting the preliminary output into a second machine-learned model that generates the output.

4. The method of claim 2, further comprising:
identifying a plurality of tokens in the sentence;
based on the plurality of tokens, identifying a plurality of token embeddings, each corresponding to a different token of the plurality of tokens; and
generating the sentence embedding based on the plurality of token embeddings.

5. The method of claim 1, wherein:
the plurality of levels of granularity include the segment level;
performing the analysis of the potential item at the segment level comprises:
identifying a plurality of potential items included within the document;
sorting the plurality of potential items into the plurality of segments, each segment including one or more potential items from the plurality of potential items;
identifying a potential embedding for the potential item;
for each segment of the plurality of segments:
determining a segment-level embedding that is based on the one or more potential items that are included in said each segment;
determining a similarity between the segment-level embedding and the potential embedding; and
generating an output of the plurality of outputs based on the similarity associated with each segment of the plurality of segments.

6. The method of claim 5, further comprising:
identifying, within the document, a plurality of text chunks; and
for each text chunk of the plurality of text chunks, assigning said each text chunk to a segment of the plurality of segments.

7. The method of claim 5, wherein a particular segment-level embedding of a particular segment of the plurality of segments is based on a plurality of potential item embeddings that correspond to multiple potential items that are included in the particular segment.

8. The method of claim 1, wherein:
the potential item is a particular type of entity;
the plurality of levels of granularity include the document level;
performing the analysis of the potential item at the document level comprises:
identifying a plurality of items, each of which is of a type that is different than the particular type, included within the document;
identifying a plurality of entity embeddings, one for each entity in the plurality of items;
identifying a potential embedding for the potential item;
for each entity embedding in the plurality of entity embeddings:
determining a similarity measure between said each entity embedding and the potential embedding;
adding the similarity measure to a set of similarity measures; and
generating an output of the plurality of outputs based on the set of similarity measures.

9. The method of claim 1, wherein the potential item is a name of a skill and the document is an opportunity posting.

10. The method of claim 1, further comprising:
based on the association and one or more attributes of a plurality of users, identifying a subset of the plurality of users;
causing data about the document to be presented to each user in the subset of the plurality of users.

11. A method, performed by one or more computing devices, comprising:
identifying, within a document, a plurality of potential items, which includes a plurality of segments and a plurality of sentences, wherein at least one segment of the plurality of segments includes multiple sentences of the plurality of sentences; and
for each potential item in the plurality of potential items:
identifying, in the document, at least one sentence of the plurality of sentences in which said each potential item occurs;
identifying a potential embedding for said each potential item;
identifying a sentence embedding for the at least one sentence;
inputting the potential embedding and the sentence embedding into a machine-learned model that outputs multiple sets of scores for said each potential item based on a level of granularity of the potential item;
based on a score of the multiple sets the score exceeding a predefined threshold, determining whether to cause said each potential item to be presented on a computing device based on the score of the multiple sets of score, wherein the method is performed by one or more computing devices.

12. The method of claim 11, wherein the document is provided by a user and the computing device is operated by the user.

13. One or more storage media storing instructions which, when executed by one or more processors, cause:
identifying a potential item within a document, which includes a plurality of segments and a plurality of sentences, wherein at least one segment of the plurality of segments includes multiple sentences of the plurality of sentences;
performing an analysis of the potential item at a plurality of levels of granularity that includes two or more of a sentence level, a segment level, or a document level;
producing a plurality of outputs based on performing the analysis of the potential item at the plurality of levels of granularity, the plurality of outputs including an output for each level of granularity in the plurality of levels of granularity;
inputting the plurality of outputs into a machine-learned model to generate multiple set of scores a score for the potential item based on the level of granularity of the potential item;
causing the potential item to be presented on a computing device, based on a score of the multiple set of scores exceeding a predefined threshold; and
in response to user selection of the potential item while the potential item is presented on the computing device, creating an association between the potential item and the document.

14. The one or more storage media of claim 13, wherein:
the plurality of levels of granularity include the sentence level;
performing the analysis of the potential item at the sentence level comprises:
identifying, in the document, a sentence in which the potential item occurs;
identifying a potential embedding for the potential item;

identifying a sentence embedding for the sentence; and
generating an output of the plurality of outputs based on the potential embedding and the sentence embedding.

15. The one or more storage media of claim 14, wherein generating the output comprises:
   inputting the potential embedding and the sentence embedding into an encoder that produces a preliminary output; and
   inputting the preliminary output into a second machine-learned model that generates the output.

16. The one or more storage media of claim 14, wherein the instructions, when executed by the one or more processors, further causes:
   identifying a plurality of tokens in the sentence;
   based on the plurality of tokens, identifying a plurality of token embeddings, each corresponding to a different token of the plurality of tokens; and
   generating the sentence embedding based on the plurality of token embeddings.

17. The one or more storage media of claim 13, wherein:
   the plurality of levels of granularity include the segment level;
   performing the analysis of the potential item at the segment level comprises:
      identifying a plurality of potential items included within the document;
      sorting the plurality of potential items into the plurality of segments, each segment including one or more potential items from the plurality of potential items;
      identifying a potential embedding for the potential item;
      for each segment of the plurality of segments:
         determining a segment-level embedding that is based on the one or more potential items that are included in said each segment;
         determining a similarity between the segment-level embedding and the potential embedding; and
         generating an output of the plurality of outputs based on the similarity associated with each segment of the plurality of segments.

18. The one or more storage media of claim 17, wherein the instructions, when executed by the one or more processors, further causes:
   identifying, within the document, a plurality of text chunks; and
   for each text chunk of the plurality of text chunks, assigning said each text chunk to a segment of the plurality of segments.

19. The one or more storage media of claim 17, wherein a particular segment-level embedding of a particular segment of the plurality of segments is based on a plurality of potential item embeddings that correspond to multiple potential items that are included in the particular segment.

20. The one or more storage media of claim 13, wherein:
   the potential item is a particular type of entity;
   the plurality of levels of granularity include the document level;
   performing the analysis of the potential item at the document level comprises:
      identifying a plurality of items, each of which is of a type that is different than the particular type, included within the document;
      identifying a plurality of entity embeddings, one for each entity in the plurality of items;
      identifying a potential embedding for the potential item;
      for each entity embedding in the plurality of entity embeddings:
      determining a similarity measure between said each entity embedding and the potential embedding;
      adding the similarity measure to a set of similarity measures; and
      generating an output of the plurality of outputs based on the set of similarity measures.

* * * * *

UNITED STATES PATENT AND TRADEMARK OFFICE
CERTIFICATE OF CORRECTION

PATENT NO. : 11,487,947 B2
APPLICATION NO. : 16/716402
DATED : November 1, 2022
INVENTOR(S) : Shi et al.

It is certified that error appears in the above-identified patent and that said Letters Patent is hereby corrected as shown below:

In the Claims

In Column 24, Line 50, in Claim 13, after "set of scores", delete "a score"

Signed and Sealed this
Tenth Day of January, 2023

Katherine Kelly Vidal
*Director of the United States Patent and Trademark Office*